United States Patent Office 3,350,394
Patented Oct. 31, 1967

3,350,394
METHOD FOR PRODUCING 16 METHYLENE REICHSTEIN S AND INTERMEDIATES THEREOF
Eugene J. Agnello and Gerald D. Laubach, Lyme, and Walter T. Moreland, Niantic, Conn., assignors to Chas. Pfizer & Co., Inc., New York, N.Y., a corporation of Delaware
No Drawing. Filed Apr. 26, 1961, Ser. No. 105,575
5 Claims. (Cl. 260—239.5)

This application is concerned with a new and useful method for the preparation of 16-methylene-$\Delta^4$-pregnene-17α,21-diol-3,20-dione, the corresponding $\Delta^1$, $\Delta^6$ and $\Delta^{1,6}$-compounds and 21-esters thereof. It is concerned also with the valuable compounds themselves and with intermediates used in their preparation. The final products of this invention are useful because they can be converted by known methods to the valuable therapeutically active compounds described and claimed in U.S. Patent 2,865,808, issued on Dec. 23, 1958.

The final products within the purview of this invention are represented by the formulas

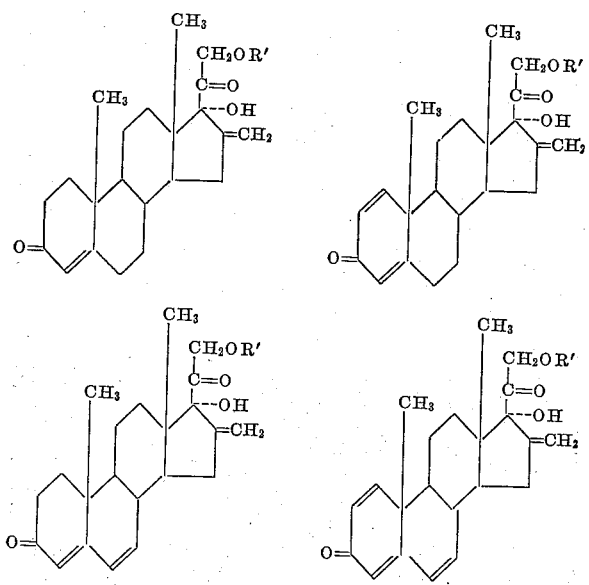

wherein R' is hydrogen or an acyl hydrocarbon group containing only carbon, hydrogen and oxygen up to a total of ten carbon atoms.

The compounds and process of this invention are illustrated by the following synthetic sequence starting with the known compound $\Delta^{4,16}$-pregnadiene-21-ol-3,20-dione 21-acetate. Other esters can be used.

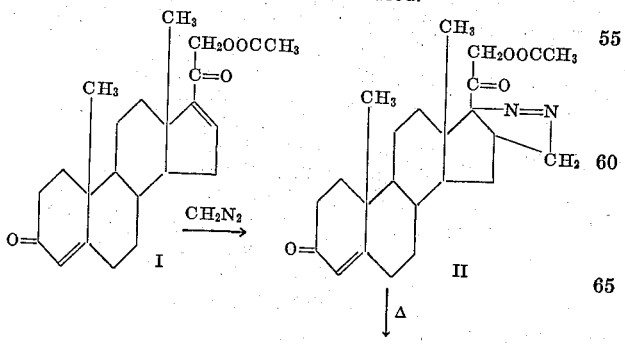

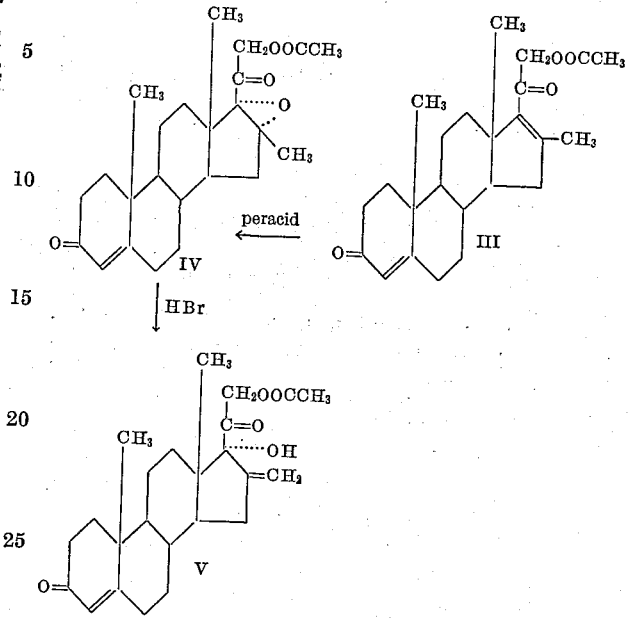

Subsequent changes in the A- and the B-rings may be effected in known ways. For example, a double bond in the A-ring may be introduced with selenium dioxide. A double bond in the B-ring may be introduced with chloranil or equivalent quinone. For the preparation of $\Delta^{1,4,6}$-compounds, these reactions can be carried out in either order.

In the first step of this synthesis, a 16α,17α-pyrazolino compound, i.e. a 16α,17α - methyleneazopregnene is formed by reaction, in a reaction inert organic solvent, between the $\Delta^{16}$-steroid substrate and diazomethane. The diazomethane is formed in the usual way and is used in ether or equivalent solvent. In order to insure as complete utilization as possible of the steroid substrate, at least a molar equivalent of diazomethane will be used. Generally, an excess will be employed, e.g. from about 50% to about 1000% molar excess, although the amount is not critical. The temperature at which reaction is effected will usually be below 30° C. and temperatures of from about −10° C. to about 25° C. are preferred. The time of reaction is not critical, but for best yields, the reactions will be allowed to stand in the reaction medium at the selected temperature for from about 4 to about 100 hours. It may be convenient to initiate reaction at a lower temperature and continue it at a higher temperature. For example, the reactants may be mixed at approximately 0° C., allowed to stand at that temperature for a short time and then maintained at room temperature for the balance of the reaction period. As indicated above, the diazomethane is usually prepared in ether, although other solvents known to those skilled in the art can be employed. The steroid reactant will usually be employed in a halogenated hydrocarbon solvent containing up to two carbon atoms. Chloroform, carbon tetrachloride, methylene chloride and ethylene chloride may be mentioned by way of example.

The desired product is isolated using the procedures generally employed for this type of reaction. The simplest procedure is to simply remove the solvent and excess diazomethane in vacuo. If desired, the excess diazomethane may be decomposed by the addition of aqueous acid prior to removal of the solvent. The product may be purified, if desired, by trituration with ether or by recrystallization from a suitable solvent or solvent system such as acetone-petroleum ether.

Compounds prepared by this reaction are new and useful and they are specifically included within the scope of this invention. They include 16α,17α-[3,1-(1-pyrazolino)]-$\Delta^4$-pregnene-21-ol-3,20-dione and the lower 21-acyl hydrocarbon esters containing up to ten carbon atoms.

In the next step of this synthesis, the azo compound prepared as described above is decomposed by pyrolysis to produce a 16-methyl-$\Delta^{16}$-steroid. Decomposition is effected by heating the compound at from about 140 to about 180° C. at a pressure of from about 0.1 to about 760 mm. of mercury. The time of the reaction depends on the conditions employed. At high temperature and low pressure, decomposition is complete in about one-half hour. In the lower temperature and higher pressure ranges, the time for complete reaction may be prolonged to about two hours.

The product is generally obtained as a glass. Crystallization can be induced by treatment with a suitable recrystallization solvent or solvent system. Acetone-petroleum ether is particularly effective. Other suitable solvents will be known to those skilled in the art.

The 16-methyl-$\Delta^{16}$-compounds obtained by this reaction are new and useful. They are specifically included within the scope of this invention. They include 16-methyl-$\Delta^{4,16}$-pregnadiene-21-ol-3,20-dione and 21-acyl hydrocarbon esters thereof containing up to ten carbon atoms. The esters can be used directly in the next reaction. The free 21-hydroxy compounds can be esterified under the usual conditions and then utilized.

The compound thus prepared is next converted to a 16α,17α-epoxido compound by reaction with at least a molar equivalent of a peracid. The reaction takes place in a reaction inert organic solvent or solvent system. Preferred solvents include aliphatic and cyclic aliphatic ethers containing up to 8 carbon atoms, such as, for example, diethyl ether, di-n-butyl ether, dioxane and tetrahydrofuran. Solubility of the steroid substrate may be enhanced by the addition of small amounts, say from about 3% to about 8%, of halogenated hydrocarbons containing up to two carbon atoms, although this is not necessary. Methylene chloride and ethylene chloride are especially useful.

Reaction is effected by contacting the steroid substrate with the selected peracid, such as, for example, peracetic, perbenzoic or perphthalic acid in the chosen solvent at a temperature of from about 20° C. to about 35° C. The time of reaction is not critical and will depend upon the amount of reactants employed, the temperature and other factors well-known to those skilled in the art. One merely maintains the reactants in contact with each other until substantially one molar equivalent of peracid has been absorbed. This can be readily determined by removing aliquots from time to time, decomposing the peracid, and titrating with a standard base. Generally, an excess of peracid will be employed to ensure as complete reaction as possible of the steroid. Molar excesses of from about 10% to as high as 600% or even higher may be used. At a temperature of about 25° C., employing a 500% molar excess of peracid the time of reaction is about 24 hours. Within practical economic limits with respect to time, temperature and molar excess of peracid, the reaction is usually completed during a period of from about 20 to about 30 hours. It is preferred, although not essential, that the peracid be acid free so as to minimize deleterious side reactions.

The product is isolated in accordance with standard procedures. The most practical method is to decompose and neutralize the excess acid with aqueous base, separate the organic layer, if possible, and remove the organic layer in vacuo. Purification may be effected by recrystallization from a suitable solvent such as isopropyl alcohol.

In the next step of this valuable sequence, the hydroxyl group at the 17-position is introduced with simultaneous formation of the 16-methylene substituent by reaction with hydrogen bromide. The reaction is effected by contacting the steroid substrate with hydrogen bromide in a reaction inert organic solvent at a temperature of from about 15° C. to about 40° C. for a period of from about four to about twenty-four hours. The amount of hydrogen bromide used is not critical. Theoretically only a catalytic amount need be employed since it is regenerated in the reaction. It is, however, generally preferred to use at least 0.1 molar equivalent of this reagent. In practice, from about 0.1 to about 0.33 molar equivalent of hydrogen bromide in a lower organic acid solvent containing up to five carbon atoms is used. It is preferred to use acetic acid.

Suitable organic solvents for the reaction include halogenated hydrocarbon solvents of the class described above and these may be mixed with ether to enhance solubility.

The product may be isolated in any convenient manner. One method is to first wash the reaction mixture with water, then with dilute aqueous sodium carbonate and again with water. The organic layer is separated, dried over an anhydrous drying agent such as sodium sulfate, filtered and the solvent removed in vacuo to leave the desired product as a residue. It may be purified by recrystallization, for example, from acetone-petroleum ether.

A $\Delta^{4,6}$-compound of this invention is prepared by contacting a 3-keto-$\Delta^4$-substrate prepared as described above with a quinone having an oxidation-reduction potential less than —0.5, at an elevated temperature between about 70° C. and 190° C. in an inert organic solvent having a boiling point of at least about 70° C. and selected from the group consisting of mononuclear aromatic hydrocarbons, mononuclear halogenated aromatic hydrocarbons, oxygenated polar aliphatic organic solvents and oxygenated polar alicyclic organic solvents. Typical solvents include tertiary butanol, n-amyl alcohol, hexanol, isoamyl alcohol, heptanol, 3-cyclohexanol, orthdichloro benzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate.

The product formed by the dehydrogenation reaction may be isolated from the resulting solvent solution by various methods. Most conveniently, the solvent may be removed by evaporation under vacuum and the solid product is then isolated from the residue. Alternatively, a solvent having a somewhat lower boiling point in which the product is soluble, for example, chloroform, methylene chloride, carbon tetrachloride, and so forth may be added. The mixture may then be washed with an aqueous solution of a reducing agent such as sodium bisulfite and then with dilute sodium hydroxide to remove the reduction product of the quinone. The solvent solution is then dried, for example, over anhydrous sodium sulfate, filtered, and the solvent removed in vacuo to leave the desired product as a residue. The product may be purified by trituration with ether.

The compounds prepared by this procedure are new and useful intermediates and it is specifically intended to include them within the scope of the invention. They include 16-methylene-$\Delta^{4,6}$-pregnadiene-17α,21-diol-3,20-dione and the 21-acyl hydrocarbon esters thereof.

A $\Delta^{1,4}$-compound of this invention may be prepared by reaction between a $\Delta^4$-3-keto steroid or a $\Delta^{4,6}$-3-keto steroid prepared as described above and selenium dioxide in a reaction inert organic solvent at an elevated temperature of from about 75° C. to about 200° C. for from about 1 to about 100 hours. At least one molar equivalent of selenium dioxide is used and generally several molar equivalents, e.g., up to about ten are added during the reaction period.

Solvents which are useful for the reaction include organic solvents inert to the selenium dioxide and to the steroid reactants and products. They include, for example, tertiary butanol, tertiary pentanol, benzene, ethylene glycol diethers such as dibutyl Cellosolve, dipropyl ether, ethylene glycol and various other glycol ethers, phenetole, xylene, dioxane and naphthalene.

The product is isolated by any convenient method. Suitably the solvent is removed preferably by evaporation under vacuum. The crude product may then be purified by crystallization from a solvent or solvent mixture or by chromatographic purification by various absorbents such as aluminum, silica gel, or activated earths. A suitable recrystallization solvent is ethyl acetate.

Products prepared by this reaction are new and useful intermediates and it is specifically intended to include them within the scope of this invention. They include 16-methylene - $\Delta^{1,4}$ - pregnadiene-17$\alpha$,21-diol-3,20-dione, 16-methylene-$\Delta^{1,4,6}$-pregnatriene-17$\alpha$,21-diol-3,20-dione and the 21-acyl hydrocarbon esters of these compounds containing up to 10 carbon atoms.

As stated above, the compounds of this invention are useful because they can be converted by known reactions to the therapeutically useful compounds described and claimed in U.S. Patent 2,865,808 issued Dec. 23, 1958. Each of them can be converted to therapeutically useful 11$\beta$-hydroxyl compounds using an organism of the genus Curvularia as described and claimed in the U.S. Patent 2,658,023 issued Nov. 3, 1953. The 11$\beta$-hydroxy compounds can be converted to 11-keto compounds by standard oxidation procedures including, for example, oxidizing with chromium trioxide or N-bromo acetamide. Halogen atoms at the 9-position can be introduced by the standard procedure of Fried et al. as described in the Journal of the American Chemical Society, 79, page 1130.

The following examples are given solely for the purpose of illustration and are not to be construed as limitations of this invention, many apparent variations of which are possible without departing from the spirit or scope thereof.

EXAMPLE I

*16$\alpha$,17$\alpha$-[3,1-(1pyrazolino)]-$\Delta^4$-pregnene-21-ol-3,20-dione*

A total of 5 g. of $\Delta^{4,16}$-pregnadiene-21-ol-3,20-dione was taken up in 100 ml. of ethylene chloride and an equimolar portion of diazomethane in ether was added at −10° C. The mixture was maintained at this temperature for 100 hours and the solvent removed in vacuo to leave the desired product as a residue. It was purified by recrystallization from acetone-petroleum ether.

EXAMPLE II

*16$\alpha$,17$\alpha$-[3,1-(1pyrazolino)]-$\Delta^4$-pregnene-21-ol-3,20-dione-21-acetate*

A total of 5 g. of $\Delta^{4,16}$-pregnadiene-21-ol-3,20-dione-21-acetate was taken up in 100 ml. of chloroform and a 1000% molar excess of diazomethane in butyl ether was added at 30° C. The mixture was maintained at that temperature for four hours and the desired product isolated by removal of the solvent in vacuo.

EXAMPLE III

*16$\alpha$,17$\alpha$-[3,1-(1pyrazolino)]-$\Delta^4$-pregnene-21-ol-3,20-dione-21-decanoate*

A total of 5 g. of $\Delta^{4,16}$-pregadiene-21-ol-3,20-dione-21-decanoate was taken up in 100 ml. of methylene chloride and a 100% molar excess of diazomethane in ether was added at 0° C. The mixture was maintained at that temperature for 16 hours and allowed to come to room temperature (approximately 25–30° C.). It was maintained at the latter temperature for 50 hours. An equal volume of 5% aqueous hydrochloric acid was added and the mixture stirred for 20 minutes. The organic layer was separated, dried over anhydrous magnesium sulfate, filtered and the desired product recovered by removal of the solvent in vacuo.

EXAMPLE IV

*16$\alpha$,17$\alpha$-[3,1-(1pyrazolino)]-$\Delta^4$-pregnene-21-ol-3,20-dione-21-isobutyrate*

A total of 5 g. of $\Delta^{4,16}$-pregnadiene-21-ol-3,20-dione-21-isobutyrate was taken up in 100 ml. of ethylene chloride and a 200% molar excess of diazomethane in ether was added at 10° C. The mixture was maintained at this temperature for 35 hours and an equal volume of water was added. The mixture was stirred for 20 minutes and the organic layer separated. It was dried over anhydrous sodium sulfate, filtered and the desired product recovered by removal of the solvent in vacuo.

EXAMPLE V

*16-methyl-$\Delta^{4,16}$-pregnadiene-21-ol-3,20-dione*

A total of 5 g. of the product prepared in Example I was heated to 140° C. at a pressure of 0.1 mm. of mercury and maintained at this temperature for 2 hours. The glass-like product that remained was cooled and taken up in acetone and precipitated by the addition of petroleum ether. It was purified by a second recrystallization from acetone-petroleum ether.

EXAMPLE VI

*16-methyl-$\Delta^{4,16}$-pregnadiene-21-ol-3,20-dione-21-acetate*

A total of 5 g. of the product prepared in Example II was heated to 180° C. at a pressure of 760 mm. of mercury and maintained at this temperature for ½ hour. The glass-like product that remained was cooled and taken up in acetone and precipitated by the addition of petroleum ether. It was purified by a second recrystallization from acetone-petroleum ether.

EXAMPLE VII

*16-methyl-$\Delta^{4,16}$-pregadiene-21-ol-3,20-dione-21-decanoate*

A total of 5 g. of the product prepared in Example III was heated to 150° C. at a pressure of 10 mm. of mercury and maintained at this temperature for 1 hour. The glass-like product that remained was cooled and taken up in acetone and precipitated by the addition of petroleum ether. It was purified by a second recrystallization from acetone-petroleum ether.

EXAMPLE VIII

*16-methyl-$\Delta^{4,16}$-pregnadiene-21-ol-3,20-dione 21-isobutyrate*

A total of 5 g. of the product prepared in Example IV was heated to 150° C. at a pressure of 600 mm. of mercury and maintained at this temperature for 1½ hours. The glass-like product that remained was cooled and taken up in acetone and precipitated by the addition of petroleum ether. It was purified by a second recrystallization from acetone-petroleum ether.

EXAMPLE IX

*16$\beta$-methyl-16$\alpha$-17$\alpha$-epoxido-$\Delta^4$-pregnene-21-ol-3,10-dione 21-acetate*

A total of 2 g. of the product prepared in Example VI in 500 ml. of diethyl ether containing 20 ml. of methylene chloride was treated with 100 ml. of an ether solution of monoperphthalic acid containing 4.89 g. of this reagent (500% molar excess) for 27 hours at approximately 25°. At the end of this period, an equivalent of peracetic acid had been consumed. The reaction mixture was washed successively with 10% sodium carbonate, 10% sodium bisulfite, 10% sodium carbonate and water and the organic layer evaporated to dryness in vacuo. The residue was dissolved in 25 ml. of boiling methanol, cooled and filtered. The desired product was precipitated by the addition of water and recovered by filtration. It was recrystallized from isopropyl alcohol to remove a small portion of less soluble starting material. The recrystallized product melted at 125–130° C.

EXAMPLE X

*16β-methyl-16α,17α-epoxido-Δ⁴-pregnene-21-ol-3,20-dione 21-decanoate*

A total of 2 g. of the product prepared in Example VII was taken up in 500 ml. of tetrahydrofuran and a 10% molar excess of peracetic acid in this same solvent was added. The mixture was maintained at 35° C. for 30 hours. The mixture was then neutralized by the addition of 10% aqueous sodium bicarbonate and evaporated to dryness in vacuo. The residue was washed with cold water to remove inorganic material. The residue was taken up in 25 ml. of boiling methanol, and the desired product isolated as described in the previous example.

EXAMPLE XI

*16β-methyl-16α,17α-epoxido-Δ⁴-pregnene-21-ol-3,20-dione 21-isobutyrate*

A total of 2 g. of the product prepared in Example VIII was taken up in 500 ml. of dioxane containing a 600% molar excess of perbenzoic acid and maintained at 20° C. for 20 hours. The product was isolated as described in the previous example.

EXAMPLE XII

*16-methylene-Δ⁴-pregnene-17α,21-diol-3,20-dione 21-acetate*

A total of 5 g. of the product prepared in Example IX was taken up in 100 ml. of ethylene chloride and 0.1 molar equivalent of hydrogen bromide dissolved in 15 ml. of acetic acid was added. The mixture was maintained at 15° C. for 24 hours. It was then washed with an equal volume of water and this was followed with a second washing with an equal volume of 5% aqueous sodium carbonate solution and a third wash with an equal volume of water. The organic layer was separated, dried over anhydrous sodium sulfate, filtered and the desired product recovered by removal of the solvent in vacuo. It was purified by recrystallization with acetone-petroleum ether.

EXAMPLE XIII

*16-methylene-Δ⁴-pregnene-17α,21-diol-3,20-dione 21-acetate*

A total of 5 g. of the product prepared in Example IX was taken up in 100 ml. of methylene chloride and 0.33 molar equivalent of hydrogen bromide dissolved in 15 ml. of valeric acid was added. The mixture was maintained at 40° C. for 4 hours. It was then washed with an equal volume of water and this was followed with a second washing with an equal volume of 5% aqueous sodium carbonate solution and a third wash with an equal volume of water. The organic layer was separated, dried over anhydrous sodium sulfate, filtered and the desired product recovered by removal of the solvent in vacuo. It was purified by recrystallization with acetone-petroleum ether.

EXAMPLE XIV

*16-methylene-Δ⁴-pregnene-17α,21-diol-3,20-dione 21-decanoate*

A total of 5 g. of the product prepared in Example X was taken up in 100 ml. of ethylene chloride and 0.1 molar equivalent of hydrogen bromide dissolved in 15 ml. of acetic acid was added. The mixture was maintained at 15° C. for 24 hours. It was then washed with an equal volume of water and this was followed with a second washing with an equal volume of 5% aqueous sodium carbonate solution and a third wash with an equal volume of water. The organic layer was separated, dried over anhydrous sodium sulfate, filtered and the desired product recovered by removal of the solvent in vacuo. It was purified by recrystallization with acetone-petroleum ether.

The procedures of Examples XII through XIV were repeated to prepare a number of other 21-esters within the purview of this invention including the propionate, butyrate, isobutyrate, valerate, and octanoate.

EXAMPLE XV

*16-methylene-Δ¹,⁴-pregnadiene-17α,21-diol-3,20-dione*

A mixture of 0.8 g. of the product obtained by hydrolysis of the product prepared in Example XII and 0.8 g. of freshly sublimed selenium dioxide in 10 ml. of tert-butanol was heated in a nitrogen atmosphere for 10½ hours at 75° C. The solution was filtered and the desired product precipitated by the addition of water. It was isolated by filtration.

EXAMPLE XVI

*16-methylene-Δ¹,⁴-pregnadiene-17α,21-diol-3,20-dione 21-acetate*

A mixture containing 0.3 g. of the product prepared in Example XIII and 0.3 ml. of glacial acetic acid in 30 ml. of tert-butanol was prepared. To this mixture there was added 0.2 grams of selenium dioxide and the mixture was refluxed in a nitrogen atmosphere for 3 hours. An additional 0.1 gram of selenium dioxide was added and refluxing was continued for 4 more hours. The mixture was filtered and the filtrate evaporated to dryness in vacuo. The residue was taken up in 25 ml. of ethyl acetate and washed with one 5 ml. portion of water, twice with 5 ml. portions of 5% aqueous of ice cold 15% ammonium sulfide, once with 5 ml. of cold 2 N ammonium hydroxide, once with 5 ml. of water, once with 5 ml. of 2 N hydrochloric acid and finally twice with 5 ml. portions of water. The layers were separated and the organic layer dried over anhydrous sodium sulfate, filtered and evaporated to dryness in vacuo. The residue was triturated with ether and dried in vacuo to obtain the desired product.

EXAMPLE XVII

*16-methylene-Δ¹,⁴-pregnadiene-17α,21-diol-3,20-dione 21-decanoate*

A mixture containing 0.3 g. of the product prepared in Example XIV in 150 ml. of phenetole containing one molar equivalent of selenium dioxide was refluxed for 1 hour. The mixture was cooled and extracted with chloroform. It was filtered through a filter aid and the solvents removed in vacuo. The product was chromatographed on a column of florisil to obtain the purified products. Selected fractions of the eluate were evaporated to obtain crystals. The crystalline product was triturated with ethyl acetate and dried.

EXAMPLE XVIII

*16-methylene-Δ¹,⁴-pregnadiene-17α,21-diol-3,20-dione 21-isobutyrate*

A total of 10 g. of 16-methylene-Δ⁴-pregnene-17α,21-diol-3,20-dione 21-isobutyrate in 300 ml. of tert-butanol containing 5 molar equivalents of selenium dioxide was refluxed for 1 hour. The product was recovered from the reaction mixture as described in the previous example.

EXAMPLE XIX

*16-methylene-Δ¹,⁴-pregnadiene-17α,21-diol-3,20-dione 21-octanoate*

A total of 10 g. of 16-methylene-Δ⁴-pregnene-17α,21-diol-3,20-dione 21-octanoate and ten molar equivalents of selenium dioxide was refluxed in tert-butanol for 100 hours. The mixture was filtered and the desired product recovered by removal of the solvent in vacuo.

EXAMPLE XX

*16-methylene-Δ¹,⁴-pregnadiene-17α,21-diol-3,20-dione 21-hexenoate*

A mixture containing 10 g. of 16-methylene-Δ⁴-pregnene-17α,21-diol-3,20-dione 21-hexenoate in 200 ml. of tert-butanol containing 5 molar equivalents of selenium dioxide was refluxed for 1 hour under nitrogen. The solvent was removed in vacuo and the residue taken up in chloroform. The solution was purified and isolated as described in Example XVII.

EXAMPLE XXI

*16-methylene-Δ⁴,⁶-pregnadiene-17α,21-diol-3,20-dione*

A total of 808 mg. of the product obtained by hydrolysis of the product prepared in Example XII and 900 mg. of chloranil were added to 72 ml. of xylene. The mixture was refluxed under an atmosphere of nitrogen for 18 hours. The reaction mixture was then diluted with 150 ml. of chloroform. The solution was washed with an equal volume of 5% sodium hydroxide solution and then with water. It was then dried over anhydrous sodium sulfate, filtered, and the desired product recovered by removal of the solvent in vacuo.

EXAMPLE XXII

*16-methylene-Δ⁴,⁶-pregnadiene-17α,21-diol-3,20-dione 21-acetate*

A total of 3 g. of product prepared in Example XIII in 100 ml. of n-amyl alcohol was refluxed with an equimolar portion of 2,6-dichloro-1,4-benzoquinone for 2 hours and the desired product was isolated as described in Example XXI.

EXAMPLE XXIII

*16-methylene-Δ⁴,⁶-pregnadiene-17α,21-diol-3,20-dione 21-decanoate*

A total of 3 g. of the product prepared in Example XIV in 100 ml. of ethyl acetate was refluxed with a 300% molar excess of chloranil for 30 hours and the desired product isolated in accordance with the procedure of Example XXI.

EXAMPLE XXIV

*16-methylene-Δ¹,⁴,⁶-pregnatriene-17α,21-diol-3,20-dione*

A mixture containing 0.3 g. of the product prepared in Example XII and 0.3 ml. of glacial acetic acid in 30 ml. of tert-butanol was prepared. To this mixture there was added 0.2 gram of selenium dioxide and the mixture was refluxed in a nitrogen atmosphere for 3 hours. An additional 0.1 gram of selenium dioxide was added and refluxing was continued for 4 more hours. The mixture was filtered and the filtrate evaporated to dryness in vacuo. The residue was taken up in 25 ml. of ethyl acetate and washed with one 5 ml. portion of water, twice with 5 ml. portions of 5% aqueous of ice cold 15% ammonium sulfide, once with 5 ml. of cold 2 N ammonium hydroxide, once with 5 ml. of water, once with 5 ml. of 2 N hydrochloric acid and finally twice with 5 ml. portions of water. The layers were separated and the organic layer dried over anhydrous sodium sulfate, filtered and evaporated to dryness in vacuo. The residue was triturated with ether and dried in vacuo to obtain the desired product.

EXAMPLE XXV

*Preparation of esters*

A variety of 21-esters of products prepared in the foregoing examples were prepared in accordance with standard procedures. Esters prepared included acetates, propionates, butyrates, isobutyrates, pentanoates, octanoates and decanoates.

In a typical procedure, a total of 5 g. of the 21-hydroxy compound was taken up in 50 ml. of pyridine and a 10% molar excess of acetic anhydride was added. The mixture was allowed to stand at 20° C. for 24 hours. It was then evaporated to dryness and the residue taken up in 50 ml. of chloroform. The chloroform solution was washed twice with 50 ml. portions of water, the organic layer separated, dried over anhydrous magnesium sulfate, filtered, and the acetic ester recovered by removing the solvent in vacuo.

In another typical example, a total of 5 g. of the 21-hydroxy compound, was taken up in 100 ml. of benzene, containing a 50% molar excess of aniline and a 50% molar excess of decanoyl chloride was added. The mixture was refluxed for 3 hours, washed twice with equal volumes of water and twice with equal volumes of 10% aqueous sodium hydroxide. The organic layer was dried over anhydrous sodium sulfate, filtered, and the decanoate ester recovered by removal of the solvent in vacuo.

What is claimed is:

1. A process which comprises reacting a compound having the formula

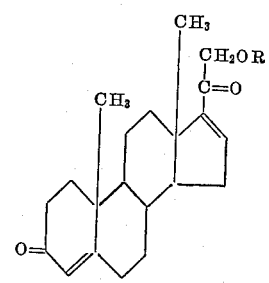

wherein R is an acyl hydrocarbon group containing only carbon, hydrogen and oxygen up to a total of ten carbon atoms with at least a molar equivalent of diazomethane in a reaction inert organic solvent at a temperature of from about −10° C. to about 25° C. to produce a compound having the formula

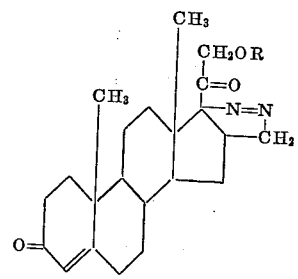

wherein R has the same meaning as above; heating resulting compound at a temperature of from about 140° C. to about 180° C. at a pressure of from about 0.1 to about 760 mm. of mercury for from about ½ to about 2 hours to produce a compound having the formula

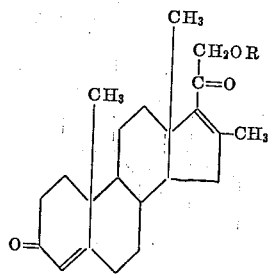

wherein R has the same meaning as above; reacting resulting compound with at least an equimolar quantity of a peracid in a reaction inert organic solvent at a temperature of from about 20 to about 35° C. to produce a compound having the formula

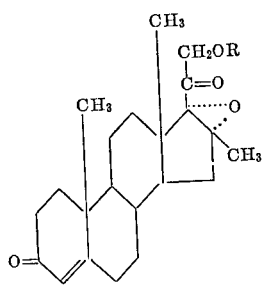

wherein R has the same meaning as above; reacting resulting compound with hydrogen bromide in a reaction inert organic solvent at a temperature of from about 15° C. to about 40° C. for a period of from about 4 to about 24 hours to produce a compound having the formula

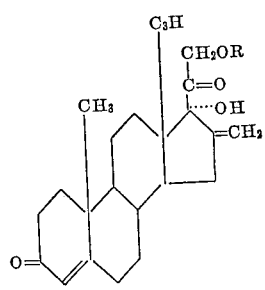

wherein R has the same meaning as above.

2. A process which comprises reacting a compound having the formula

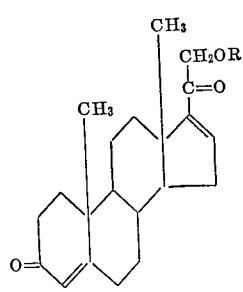

wherein R is an acyl hydrocarbon group containing only carbon, hydrogen and oxygen up to a total of ten carbon atoms with at least a molar equivalent of diazomethane in a reaction inert organic solvent at a temperature of from about −10° C. to about 25° C. to produce a compound having the formula

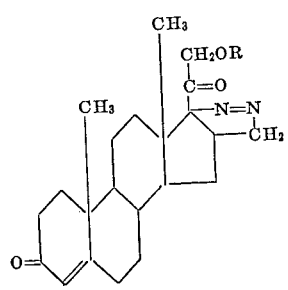

wherein R has the same meaning as above; heating resulting compound at a temperature of from about 140° C. to about 180° C. at a pressure of from about 0.1 to about 760 mm. of mercury for from about ½ to about 2 hours to produce a compound having the formula

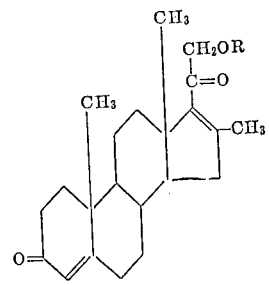

wherein R has the same meaning as above; reacting resulting compound with at least an equimolar quantity of a peracid in a reaction inert organic solvent at a temperature of from about 20 to about 35° C. to produce a compound having the formula

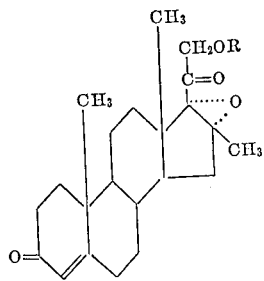

wherein R has the same meaning as above; reacting resulting compound with hydrogen bromide in a reaction inert organic solvent at a temperature of from about 15° C. to about 40° C. for a period of from about 4 to about 24 hours to produce a compound having the formula

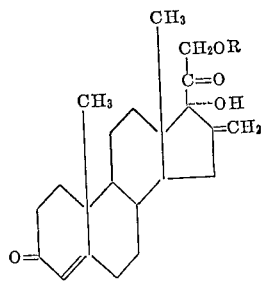

wherein R has the same meaning as above; dehydrogenating said compound with from about 1 to about 10 molar equivalents of selenium dioxide in a reaction inert organic solvent at a temperature of from about 75° C. to about 200° C. for a period of from about 1 to about 100 hours to produce a compound having the formula

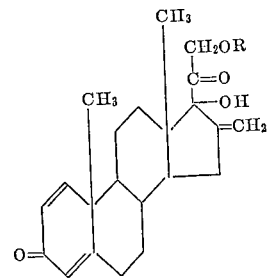

wherein R has the same meaning as above.

3. A process which comprises reacting a compound having the formula

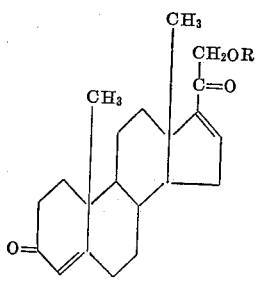

wherein R is an acyl hydrocarbon group containing only carbon, hydrogen and oxygen up to a total of ten carbon atoms with at least a molar equivalent of diazomethane in a reaction inert organic solvent at a temperature of from about −10° C. to about 25° C. to produce a compound having the formula

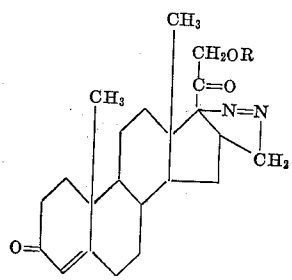

wherein R has the same meaning as above; heating resulting compound at a temperature of from about 140° C. to about 180° C. at a pressure of from about 0.1 to about 760 mm. of mercury for from about ½ to about 2 hours to produce a compound having the formula

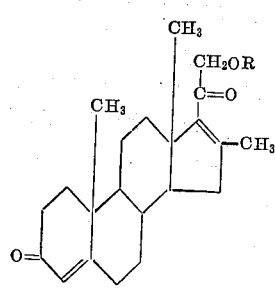

wherein R has the same meaning as above; reacting resulting compound with at least an equimolar quantity of a peracid in a reaction inert organic solvent at a temperature of from about 20 to about 35° C. to produce a compound having the formula

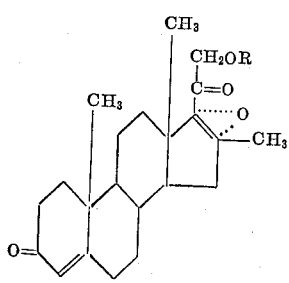

wherein R has the same meaning as above; reacting resulting compound with hydrogen bromide in a reaction inert organic solvent at a temperature of from about 15° C. to about 40° C. for a period of from about 4 to about 24 hours to produce a compound having the formula

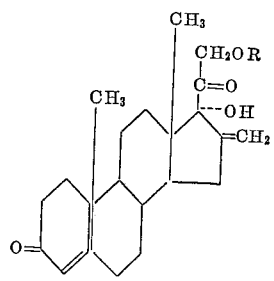

wherein R has the same meaning as above; reacting resulting compound with a quinone having an oxidizing-reduction potential less than −0.5 at an elevated temperature between about 70° C. and 190° C. in an inert organic solvent having a boiling point of at least about 70° C. and selected from the group consisting of mono-nuclear aromatic hydrocarbons, mono-nuclear halogenated aromatic hydrocarbons, oxygenated polar aliphatic organic solvents and oxygenated polar alicyclic organic solvents to produce a compound having the formula

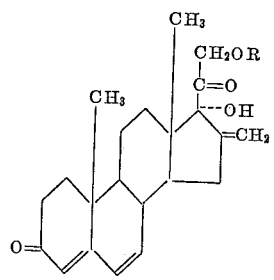

wherein R has the same meaning as above.

4. A process which comprises reacting a compound having the formula

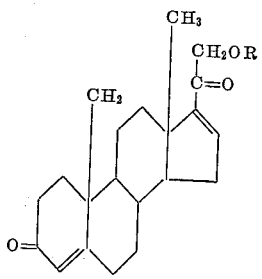

wherein R is an acyl hydrocarbon group containing only carbon, hydrogen and oxygen up to a total of ten carbon atoms with at least a molar equivalent of diazomethane in a reaction inert organic solvent at a temperature of from about −10° C. to about 25° C. to produce a compound having the formula

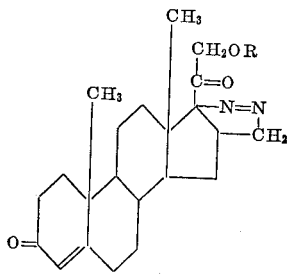

wherein R has the same meaning as above; heating resulting compound at a temperature of from about 140° C. to about 180° C. at a pressure of from about 0.1 to about 760 mm. of mercury for from about ½ to about 2 hours to produce a compound having the formula

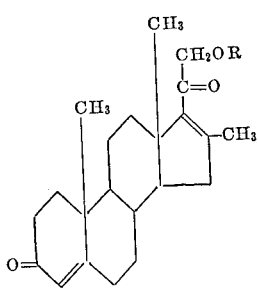

wherein R has the same meaning as above; reacting resulting compound with at least an equimolar quantity of a peracid in a reaction inert organic solvent at a temperature of from about 20 to about 35° C. to produce a compound having the formula

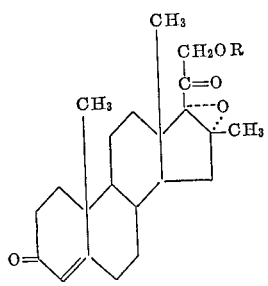

wherein R has the same meaning as above; dehydrogenating said compound with from about 1 to about 10 molar equivalents of selenium dioxide in a reaction inert organic solvent at a temperature of from about 75° C. to about 200° C. for a period of from about 1 to about 100 hours to produce a compound having the formula

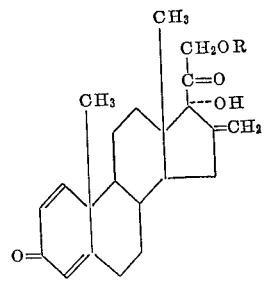

wherein R has the same meaning as above; reacting resulting compound with a quinone having an oxidizing-reduction potential less than −0.5 at an elevated temperature between about 70° C. and 190° C. in an inert organic solvent having a boiling point of at least about 70° C. and selected from the group consisting of mononuclear aromatic hydrocarbons, mononuclear halogenated aromatic hydrocarbons, oxygenated polar aliphatic organic solvents and oxygenated polar alicyclic organic solvents to produce a compound having the formula

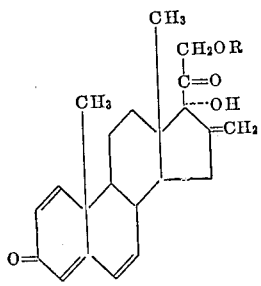

wherein R has the same meaning as above.

5. A compound selected from the group consisting of those having the formula

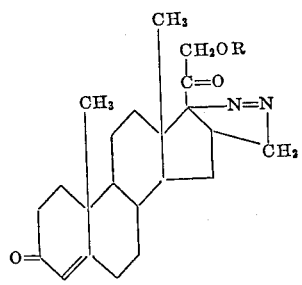

wherein R is an acyl hydrocarbon group containing only carbon, hydrogen and oxygen up to a total of ten carbon atoms.

References Cited

FOREIGN PATENTS 727,840   4/1955   Great Britain.

OTHER REFERENCES

Derwent Belgian Report No. 53A, April 1959, p. C–17 relied on.

Derwent Belgian Report No. 60A, December 1959, p. C–11 relied on.

"Tetrahedron Letters" (Mannhardt), published by Pergamon Press Ltd. (Great Britain) July 1960, pp. 21–23 relied on.

ELBERT L. ROBERTS, *Primary Examiner.*

L. H. GASTON, *Examiner.*

M. LIEBMAN, *Assistant Examiner.*